United States Patent Office 3,674,380
Patented July 4, 1972

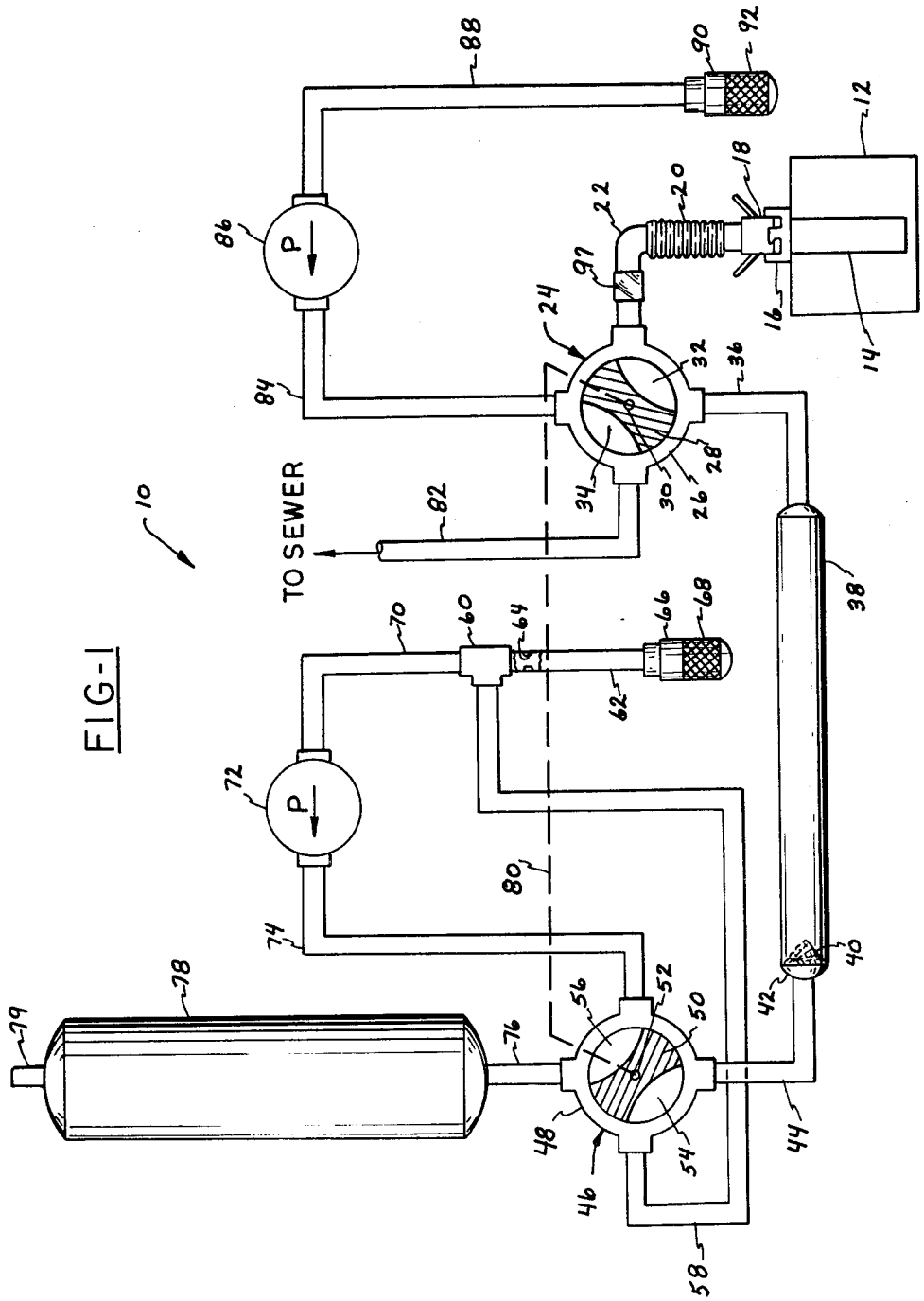

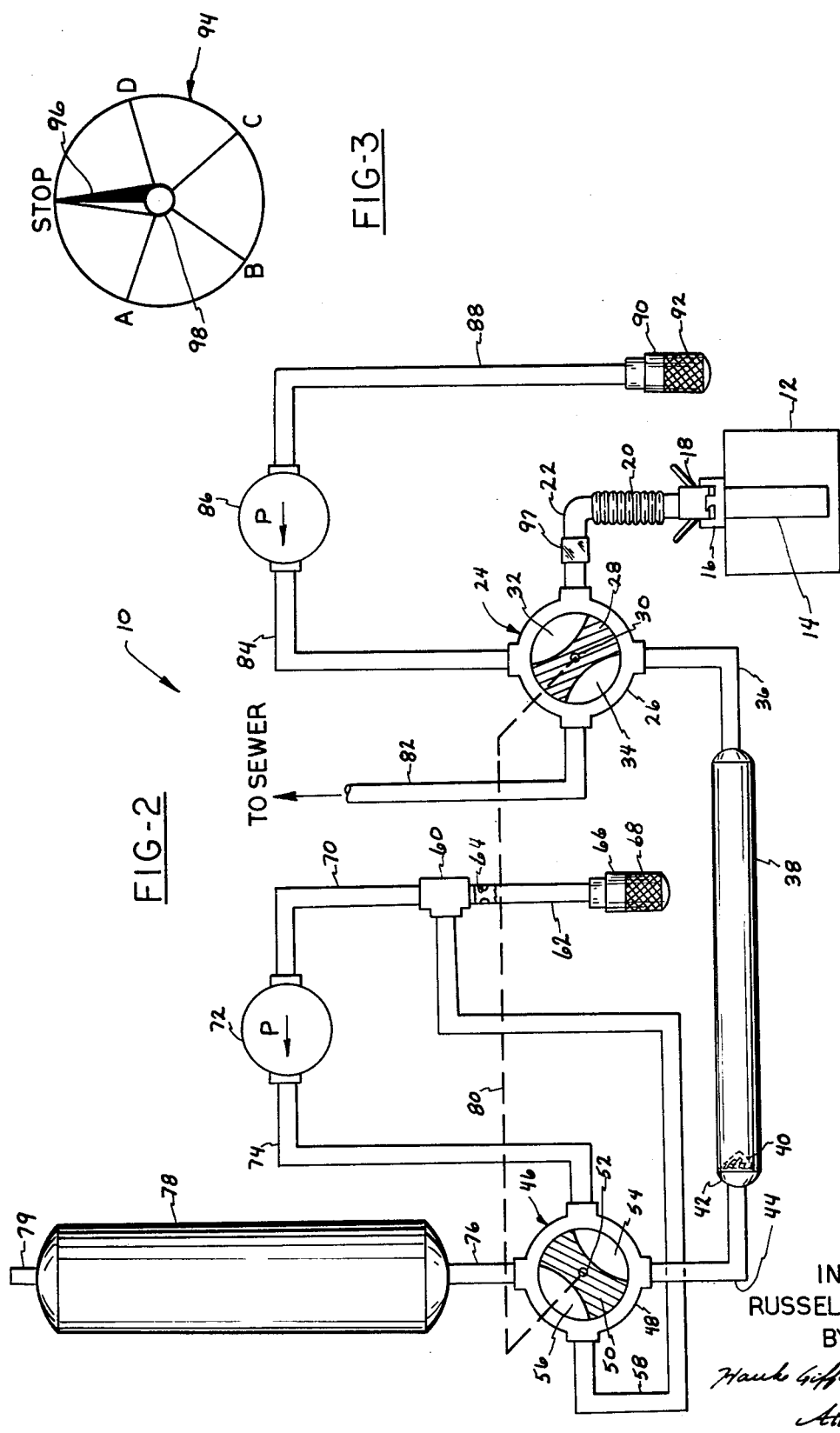

---

3,674,380
MARINE SEWAGE PUMP
Russell E. Bauer, Warren, Mich., assignor to KDI-Bauer
Corporation, Warren, Mich.
Filed May 8, 1970, Ser. No. 35,607
Int. Cl. F04f 11/00
U.S. Cl. 417—92
8 Claims

ABSTRACT OF THE DISCLOSURE

A marine sewage pump system for emptying a boat sewage tank of human sewage and refilling it with fresh water. The sewage pump system includes a pump, appropriate piping and a surge tank normally filled with fresh water and arranged for connection between the pump and the boat sewage tank. The pump draws the fresh water from the surge tank, which in turn draws the sewage from the boat sewage tank. Once the boat sewage tank has been emptied, appropriate valving means are actuated such that the pump refills the surge tank with fresh water, pumping the sewage contained therein to a sewer or other disposal system. Simultaneously, a second pump refills the boat sewage tank with fresh water.

BACKGROUND OF THE INVENTION (I) Field of the invention

The present invention relates generally to pumping systems, and more particularly to a system for emptying the sewage from boat sewage tanks.

(II) Description of the prior art

Under newly enacted anti-pollution regulations, small boats are now prevented from spilling sewage directly into the water of a lake, river or the like. Therefore, they must now be provided with a tank for holding the sewage until the boat is docked, at which time the tank may be emptied. Heretofore, a diaphragm pump of the type used for emptying house septic tanks has been used, but in such systems the emptying of each boat sewage tank requires ten to fifteen minutes. Due to the increase in the number of boats which will now be provided with sewage tanks, additional pumping equipment will be needed on docks or barges, and preferably the new equipment will be able to empty a boat sewage tank in less than the ten to fifteen minutes now required.

SUMMARY OF THE INVENTION

The marine sewage pump system of the present invention includes a first pump and a water surge tank normally filled with fresh water and disposed between the first pump and a pipe provided with a quick disconnect fitting which may be secured to the outlet of a boat sewage tank. When the quick disconnect is connected to the outlet of the boat sewage tank and the pump is actuated, water from the surge tank is pumped into a reservoir, drawing sewage from the boat sewage tank through the pipe into the surge tank. When the boat sewage tank has been emptied, a pair of valves are actuated, such that the pump pumps the water from the reservoir back into the surge tank, pumping the sewage contained therein to a sewer or other disposal system. Simultaneously with the pumping of the sewage from the surge tank to the sewer, a second pump is actuated for refilling the boat sewage tank with fresh water.

When the sewage in the surge tank has been pumped into the sewer and the boat sewage tank has been filled with fresh water, the two valves may be actuated back to their original position and the pumping cycle repeated for rinsing the boat sewage tank.

BRIEF DESCRIPTION OF THE DRAWINGS

The description refers to the accompanying drawings wherein like reference characters refer to like parts throughout the several views, and in which:

FIG. 1 is a schematic illustration of the marine sewage pump system of the present invention with the valves in position for pumping sewage from the boat sewage tank to the surge tank;

FIG. 2 is a schematic illustration of the marine sewage pump system of the present invention with the valves in position for pumping sewage from the surge tank to the sewer and for filling the boat sewage tank with fresh water; and FIG. 3 is a front elevation schematic view of a manual control for the marine sewage pump system of the invention.

DESCRIPTION OF THE PREFERRED EMBODIMENT

Referring to FIG. 1, the marine sewage pump system 10, which is preferably disposed adjacent to a boat dock or mounted on a barge or like vessel, is illustrated as being connected to a boat sewage tank 12, which may be disposed within a boat in any convenient location. The sewage tank 12 is shown as including a vertically disposed pipe 14 having its inlet disposed adjacent the bottom of the tank 12 and its outlet disposed adjacent the top thereof. The top of the pipe 14 is provided with a fitting 16 which may be connected to a quick disconnect fitting 18 forming a part of the sewage pump system 10. The fitting 18 may be of any convenient construction as is well known in the art.

The fitting 18 is on an end of a flexible hose 20 such that the fitting 18 may be moved into position for connection to the sewage tank fitting 16. The other end of the hose 20 is connected to a pipe 22 connected in turn to the inlet of a two-way valve generally indicated at 24. The valve 24 has an outer housing 26 with a rotatably mounted valve member or vane 28 disposed therein. The valve member 28 is secured to a shaft 30 rotatably mounted in the housing 26 and divides the interior of the housing 26 into two chambers 32 and 34.

With the valve member 28 in the position illustrated in FIG. 1, the chamber 32 establishes a communication between the pipe 22 and an end of a pipe 36. The other end of the pipe 36 is connected to one end of an elongated surge tank 38, which is normally filled with substantially clean water. It will be noted that in most instances the boat sewage tank 12 has a ten to fifteen gallon capacity, or even less, whereas the surge tank 38 preferably has about a thirty gallon capacity and is formed from a six inch water pipe twenty-one feet long. A screen 40, for reasons to be discussed, is disposed within the tank 38 proximate its end 42 opposite from the end connected to the pipe 36. A pipe 44 connects the end 42 of the surge tank 38 with a second valve generally indicated at 46. The valve 46 has a housing 48 with a valve member or vane 50 rotatably mounted therein. The valve member 50 is secured to a shaft 52 that is rotatably mounted in the housing 48 and separates the interior of the housing 48 into two chambers 54 and 56. With the valve member 50 in the position shown in FIG. 1, the chamber 54 places the pipe 44 in communication with a pipe 58.

The pipe 58 is connected between the valve 48 and a T-fitting 60. A pipe 62 having a restriction 64 formed therein has one end connected into the T-fitting 60 and the other end connected to a check valve 66, which is disposed below the water level of a body of fresh water such as a lake, a river or the like. The check valve 66, which may be of any conventional design, is of the one-way type which allows water to flow from the body of water into the pipe 62, but prevents the water from flowing from the pipe 62 through the check valve 66 into the body of water. The inlet of the check valve 66 may be provided with a screen 68 for preventing debris and other solid matter from entering the pipe 62 and clogging or fouling the system of the invention. A third pipe 70 is connected between the T-fitting 60 and a pump 72.

The pump 72, which may be of any conventional design well known in the art, pumps water from the pipe 70 to a pipe 74 connecting the outlet of the pump 72 to the valve 46. With the valve member 50 in the position shown in FIG. 1, the outlet of the pipe 74 communicates with the valve chamber 56. A pipe 76 connects the chamber 56 to a tank or reservoir 78. The reservoir 78 has for example a capacity of forty or more gallons. A vent 79 is disposed in the top of the reservoir 78 to allow air to escape from and enter the reservoir.

When a boat is brought into the dock to have its sewage tank 12 emptied, the valves 24 and 46 are in the respective positions illustrated in FIG. 1, the reservoir 78 is empty and the surge tank 38 is full of water. The quick disconnect fitting 18 is connected to the fitting 16 formed on the pipe 14 and the pump 72 is energized. The pump 72 pumps water from the surge tank 38, through the pipe 44 and chamber 54, the pipes 58 and 70 to the empty reservoir 78 through pipe 74, chamber 56 and pipe 76. Although the bulk of the water delivered to the reservoir 78 is drawn from the surge tank 38, a small portion is drawn by the pump 72 from the body of fresh water through the check valve 66, the pipe 62 provided with the restriction 64, and the pipe 70. The restriction 64 ensures that only a small amount of the water delivered to the reservoir 78 is drawn from the body of water. Thus, the pump 72 pumps into the reservoir 78 slightly more water than is drawn from the tank 38.

As water is pumped from the tank 38, sewage from the tank 12 is drawn up the pipe 14, through hose 20, pipe 22, chamber 32 and pipe 36 into the surge tank 38. When all of the sewage is drawn out of the tank 12, the pump 72 is deenergized by means which will be described.

As has been noted, the boat sewage tank 12 usually will have a capacity of from ten to fifteen gallons, whereas the surge tank 38 preferably has a capacity of about thirty gallons. Thus, all of the sewage contained in the tank 12 may be drawn into the tank 38. Furthermore, the tank 38 is preferably elongated and has its axis of elongation disposed in the horizontal plane. Due to the oversizing of the tank 38 and its elongated construction, the bulk of the sewage from the tank 12 will remain adjacent the end of the tank 38 into which pipe 36 is connected, thus ensuring that no sewage is drawn out of the tank 38 and into the pump 72 which might ruin it. The screen 40 further ensures that no bulk sewage is drawn out of the tank 38.

Once the sewage has been drawn into the tank 38, the valve members 28 and 50, which are preferably connected together for simultaneous operation as is illustrated by the dash line 80, are rotated approximately 90° counter-clockwise to the position illustrated in FIG. 2. Now, chamber 56 of the valve 46 establishes communication between pipes 58 and 76, while chamber 54 establishes communication between pipes 74 and 44. Chamber 34 of the valve 24 establishes communication between pipe 36 and a pipe 82, which has its other end connected into a sewer or other disposal system. Chamber 32 of the valve 24 establishes communication between pipe 22 and a pipe 84 that is connected between the housing 26 and a second pump 86. The pump 86 may be of any conventional design for pumping water. Water is supplied to the inlet of the pump 86 by a pipe 88, which has a check valve 90 secured to its inlet end. The check valve 90 is preferably disposed below the water surface of a lake or other body of water and is of the one-way type for allowing water to enter the pipe 88, but preventing water from flowing from the pipe 88 back into the body of water. The check valve 90 may be surrounded by a screen 92 to prevent debris and other solid matter from flowing into the pipe 88.

With the valve members in the position illustrated in FIG. 2, the pump 72 may be energized to pump water. Water is supplied to the pump 72 from the reservoir 78, flowing through the pipe 76, chamber 56 and pipes 58 and 70. Also, water is drawn from the body of water through the check valve 66, pipe 62 and pipe 70. The pump 72 pumps the water through the pipe 74, chamber 54 and pipe 44 into the surge tank 38, forcing the sewage contained therein through pipe 36, through chamber 34 of the valve 24 and through the pipe 82 to the sewer or other disposal system. When all of the water in the reservoir 78 has been pumped into the tank 38, the pump 72 is deenergized.

It will be noted that the quantity of water initially contained in the reservoir 78 was greater than the quantity of sewage contained in the tank 38. When the sewage is pumped out of the tank 38 by the pump 72, all of the water in the reservoir 78 and the water supplied through pipe 62 is pumped into the tank 38. Thus, more water is pumped into the tank 38 than the quantity of sewage contained therein, ensuring that all of the sewage is pumped out of the tank 38 to the sewer or other disposal system.

Simultaneously with the energization of the pump 72, the pump 86 is energized, thereby pumping water from the body of water through pipe 84, chamber 32, pipe 22 and hose 20 into the boat sewage tank 12. When the boat sewage tank 12 is approximately three-quarters full of water, the pump 86 is deenergized.

If it is desired to additionally flush the boat sewage tank to remove any sewage residuals therein, the precedently described operation is repeated.

The valve members 28 and 50 are again rotated approximately 90° clockwise back to the position illustrated in FIG. 1. The pump 72 is energized to pump the water contained in the boat tank 12 into the surge tank 38. The valve members 28 and 50 are then rotated counter-clockwise to the position illustrated in FIG. 2. The pump 72 is again energized, pumping the water in the reservoir 78 back into the surge tank 38 and flushing the surge tank. Simultaneously, the pump 86 is energized to once more fill the boat sewage tank 12 approximately three-quarters full of water. Finally, the quick disconnect fitting 18 is disconnected from the fitting 16 and the boat sewage tank 12 is now ready to be reused.

Referring to FIG. 3, a manual control device 94 is illustrated that may be connnected to appropriate conventional electrical circuitry (not shown) for controlling the operation of the pumps 72 and 86 and the position of the valve members 28 and 50. The control device 94 preferably includes a dail 96 secured to a rotatably mounted shaft 98. With the dial 96 pointed vertically upward in the "stop" position, the pumps 72 and 86 are deenergized, the valves are in the position illustrated in FIG. 1 and the tank 38 is full of fresh water. After the fitting 18 has been connected to a boat sewage tank 12 to be emptied, the dial 96 is rotated counter-clockwise to position A, which through the appropriate circuitry will energize pump 72 to pump the sewage out of tank 12 into the surge tank 38. Preferably, the circuitry contains an automatic timer or other automatic device for deenergizing the pump 72 after all of the sewage is pumped out of the tank 12. Alternatively, a window 97 may be provided in the pipe 22 to visually determine when all of the sewage has been pumped out of the tank 12.

When the boat sewage tank 12 has been emptied, dial 96 may be rotated to position B, which through appropriate means operates to rotate the valves 28 and 50 to the position illustrated in FIG. 2 and energizes pumps 72 and 86, thus causing the sewage contained in the tank 38 to be pumped to the sewer or other disposal system and filling the tank 12 with fresh water. Preferably, the circuitry includes timers or other automatic devices for deenergizing the pump 72 after the sewage has been pumped into the sewer and the pump 86 after the tank 12 has been approximately three-quarter filled with water. The dial 96 may then be rotated to position C, which through approriate means operates to rotate the valve members 28 and 50 clockwise back to the position shown in FIG. 1 and to energize the pump 72 to draw the water contained in the tank 12 into the tank 38 for flushing. Preferably, a timer is provided to deenergize pump 72 when flushing is completed.

Dial 96 may then be rotated to position D, which through appropriate means operates to rotate the valves 28 and 50 counter-clockwise to the position shown in FIG. 2 and to energize pumps 72 and 86, pumping a portion of the water contained in the tank 38 into the sewer or other disposal system and filling the tank 12 approximately three-quarter full of clean water. Preferably, timers are again provided for deenergizing the pumps 72 and 86. The dial 96 may then be rotated to the "stop" position to cause rotation of the valve members 28 and 50 clockwise to the position shown in FIG. 1. The fitting 18 may now be disconnected from the fitting 16, leaving the tank 12 three-quarter full of clean water and ready to be used again. The pump system 10 is ready to be connected to the sewage tank of another boat for the purpose of emptying, flushing and partly refilling the same with clean water.

It will be noted that the dial 96 may be manually moved to each successive position or may be automatically operated by any convenient means such as a stepping motor to each successive position. Furthermore, the control device 94 can be coin operated, if desired.

It will be appreciated by those skilled in the art that the pumping system of the invention can also be used for transferring a liquid from a first vessel to a second vessel without the liquid being ever in contact with the pump and part of the piping of the system. In this manner conventional pumps may be used for transferring corrosive liquids or liquids containing abrasive or solid particles which could rapidly damage a conventional pump or render it inoperative.

Although there has been described but one preferred embodiment of the invention, it is to be understood that various changes and revisions can be made therein without departing from the spirit of the invention or the scope of the appended claims.

What is claimed is:

1. A sewage pumping system for emptying a sewage tank of a predetermined capacity comprising:
   a surge tank normally filled with substantially clean water;
   pumping means for displacing said water from said surge tank to another tank for causing the contents of said sewage tank to be drawn into and to fill at least partially said surge tank;
   pumping means for returning said water from said other tank to said surge tank for displacing the contents of said surge tank to a disposal, whereby the contents of said sewage are prevented from entering said pumping means; and
   means for adding a relatively small quantity of substantially clean water into said other tank each time the water contained in said surge tank is displaced to said other tank.

2. The system of claim 1 wherein said first mentioned pumping means is the same as said second mentioned pumping means.

3. A sewage pumping system for emptying a sewage tank of a predetermined capacity comprising:
   a surge tank normally filled with substantially clean water;
   pumping means for displacing said water from said surge tank to another tank for causing the contents of said sewage tank to be drawn into and to fill at least partially said surge tank;
   pumping means for returning said water from said other tank to said surge tank for displacing the contents of said surge tank to a disposal, whereby the contents of said sewage are prevented from entering said pumping means; and
   additional pumping means for partially filling said sewage tank with substantially clean water each time the contents of said surge tank is displaced to a disposal.

4. A sewage pumping system for emptying a sewage tank of a predetermined capacity comprising:
   a surge tank normally filled with substantially clean water;
   pumping means for displacing said water from said surge tank to another tank for causing the contents of said sewage tank to be drawn into and to fill at least partially said surge tank;
   said pumping means being selectively operable to return said water from said other tank to said surge tank for displacing the contents of said surge tank to a disposal, whereby the contents of said sewage tank are prevented from entering said pumping means; and
   a second pumping means being operable in conjunction with said first mentioned pumping means to pump water into said sewage tank when the contents of said surge tank are emptied to said disposal.

5. A sewage pump system for emptying the contents of a sewage tank comprising:
   a surge tank normally filled with substantially clean water and having an inlet and an outlet;
   a pump having an inlet and an outlet;
   a reservoir;
   means for selectively connecting the inlet of said surge tank to said sewage tank, the inlet of said pump to the outlet of said surge tank and the outlet of said pump to said reservoir whereby the water in said surge tank is pumped from said surge tank to said reservoir for drawing into said surge tank the contents of said sewage tank; and
   said precedently mentioned means being selectively operable for connecting said reservoir to the inlet of said pump, the outlet of said pump to the outlet of said surge tank and the inlet of said surge tank to a sewage disposal whereby when the water from said reservoir is returned to said surge tank the contents of said surge tank are emptied into said sewage disposal.

6. The system as defined in claim 5 further comprising means for adding a relatively small quantity of water to the water pumped from said surge tank to said reservoir.

7. A pumping system for transferring a first liquid from a first vessel to a second vessel comprising:
   a third vessel, a fourth vessel and pumping means disposed between said third and fourth vessels;
   a second liquid normally filling said third vessel;
   means for connecting said third vessel to said first vessel whereby upon transferring said second liquid by means of said pump from said third vessel to said fourth vessel said first liquid is drawn into said third vessel; and means for connecting said third vessel to said second vessel whereby upon transferring said second liquid from said fourth vessel to said third vessel said first liquid is transferred from said third vessel to said second vessel.

8. The pumping system of claim 7 wherein said pumping means is irreversible and further comprising valving means for reversing the flow of said second liquid from said third vessel to said fourth vessel to a flow from said fourth vessel to said third vessel.

References Cited

UNITED STATES PATENTS

| 1,342,798 | 6/1920 | Farrand | 417—99 |
| 3,528,462 | 9/1970 | Quase | 4—10 X |
| 2,277,977 | 3/1942 | Hesse | 417—102 X |

CARLTON R. CROYLE, Primary Examiner

R. E. GLUCK, Assistant Examiner

U.S. Cl. X.R.

417—103